(12) United States Patent
Busley et al.

(10) Patent No.: US 7,731,306 B2
(45) Date of Patent: Jun. 8, 2010

(54) REPLACEABLE WEAR PAD, AS WELL AS METHOD FOR MANUFACTURING WEAR PADS FOR A CRAWLER TRACK

(75) Inventors: Peter Busley, Linz/Rhein (DE); Guenter Tewes, Unkel/Rhein (DE)

(73) Assignee: Wirtgen GmbH (DE)

( * ) Notice: Subject to any disclaimer, the term of this patent is extended or adjusted under 35 U.S.C. 154(b) by 0 days.

(21) Appl. No.: 11/898,249

(22) Filed: Sep. 11, 2007

(65) Prior Publication Data

US 2008/0061626 A1 Mar. 13, 2008

(30) Foreign Application Priority Data

Sep. 13, 2006 (DE) ........................ 10 2006 043 763

(51) Int. Cl.
*B62D 55/26* (2006.01)
(52) U.S. Cl. ........................................ 305/46; 305/189
(58) Field of Classification Search ................. 305/185, 305/46, 51, 53, 189, 191, 192, 159, 160, 305/161, 187, 198, 200, 201; 411/178
See application file for complete search history.

(56) References Cited

U.S. PATENT DOCUMENTS

| 638,326 | A | * | 12/1899 | Farr | ........................ 101/382.1 |
| 5,388,900 | A | * | 2/1995 | Suzuki | ........................ 305/187 |
| 5,913,579 | A | * | 6/1999 | Kumano et al. | ................ 305/46 |
| 6,213,573 | B1 | * | 4/2001 | Nakayama | ..................... 305/51 |

FOREIGN PATENT DOCUMENTS

EP 994013 A1 * 4/2000
JP 05278646 A * 10/1993
JP 09301233 A * 11/1997

OTHER PUBLICATIONS

Exhibit A: Tufpads.com website printout (2 pages) (undated but admitted to be prior art).
Exhibit B: Bridgestone MT Pad Brochure (6 pages) (undated but admitted to be prior art).
Exhibit C: Trackpads.com website printout (2 pages) (undated but admitted to be prior art).

(Continued)

*Primary Examiner*—S. Joseph Morano
*Assistant Examiner*—Kip T Kotter
(74) *Attorney, Agent, or Firm*—Waddey & Patterson, P.C.; Lucian Wayne Beavers

(57) ABSTRACT

A replaceable wear pad for a crawler track of a tracked vehicle includes base plates for fastening thereto wear pads in a detachable manner, the wear pad includes a tread and a bottom side lying opposite to the tread and facing the base plate, the wear pad containing at least one reinforcing element, and the reinforcing element being molded-in by the wear pad material, the reinforcing element includes at least two holes and the wear pad includes cavities that run coaxially to the holes of the reinforcing element and, coming from the bottom side, end above the reinforcing element and at a distance to the same with the cavities serving the purpose of accommodating fastening devices which are fastened to the reinforcing element of the wear pad.

21 Claims, 4 Drawing Sheets

OTHER PUBLICATIONS

Exhibit D: Photos of prior art reinforcing element in cross-section of wear pad (3 pages) (undated but admitted to be prior art).

Exhibit E: BLS Poly Bolt-On Track Pads brochure (2 pages) (undated but admitted to be prior art).

Exhibit F: Tufpads Truck Pads brochure (2 pages) (undated but admitted to be prior art).

Exhibit G: Artliner.co website printout (5 pages) (undated but admitted to be prior art).

* cited by examiner

REPLACEABLE WEAR PAD, AS WELL AS METHOD FOR MANUFACTURING WEAR PADS FOR A CRAWLER TRACK

BACKGROUND OF THE INVENTION

The invention relates to a replaceable wear pad for a crawler track of a tracked vehicle, in particular for construction machinery, as well as a method for manufacturing wear pads for a crawler track.

Replaceable wear pads for crawler tracks are known from prior art, which are suitable for being fastened to a base plate of the crawler track in a detachable manner.

The wear pads include, for instance, two reinforcing bars running in longitudinal direction of the wear pad, with two screw threads of retaining screws projecting from the said reinforcing bars towards the bottom side of the wear pad. The retaining screws are guided through holes of the reinforcing bars and are secured against twisting in a suitable manner.

When manufacturing these wear pads, the reinforcing bars with retaining screws inserted through corresponding holes at their ends are therefore molded-in by the wear pad material.

A disadvantage of this design is that the wear pad material also accumulates beneath the reinforcing bar during the moulding-in operation. This has the disadvantage that the bolted connections with the base plate loosen again during operation because of the soft polyurethane material between the reinforcing bar and the base plate, so that the bolted joints must be re-tightened on a regular basis. The reason for this being that the polyurethane layer between the reinforcing bar and the base plate prevents that the pre-tension of the bolted joint can be permanently maintained. It is understood that, with up to 50 wear pads per crawler track unit and with four crawler track units per machine, a considerable time effort results for re-tightening the bolted joints, which results in increased costs and an increased time requirement.

A further disadvantage of the stud bolts projecting from the wear pads is that they cause an increased transport volume and that the thread of the stud bolts may be damaged during transport.

A further disadvantage of the wear pads with projecting stud bolts is that care must be taken during moulding to protect the thread of the stud bolt from being coated with the polyurethane material during the moulding operation.

SUMMARY OF THE INVENTION

The purpose of the invention is, therefore, to create a wear pad for a crawler track of the type first mentioned above, as well as a method for manufacturing such a wear pad, which are capable of simplifying the manufacture and, as a result, of reducing the manufacturing costs, the maintenance costs, the transport costs and the time effort.

The invention provides in an advantageous manner that the reinforcing element of the wear pad shows at least two holes arranged at a distance to one another, that the wear pad shows cavities or recesses that run coaxially to the holes of the reinforcing element and, coming from the bottom side, end above the reinforcing element and at a distance to the same. The cavities or recesses serve the purpose of accommodating fastening devices which are suitable for being fastened to the reinforcing element in the wear pad.

During manufacture, the reinforcing elements are held by projecting mandrels of a mould tool, where the mandrels pass at least partially through the holes provided in the reinforcing elements.

The wear pad in accordance with the invention does not show any projecting stud bolts. As no stud bolts project from the wear pads, transport is simplified and the transport volume is reduced significantly. After manufacture of the wear pad, a fastening device can be fastened to the reinforcing element in the cavity formed by the mandrels of the mould tool.

As the fastening devices are installed later and in mounted condition rest immediately on the base plate, re-tightening the bolted joint at regular intervals can be dispensed with. An inspection of the bolted joints is, at least, required after considerably longer time intervals only. The direct abutting of the fastening means against the base plate provides a firm rest and support, wherein the reinforcing element is completely imbedded into the wear pad material, such that it would not be detached from the wear pad even if high shear forces occur.

The subsequently installed fastening devices do preferably not project vis-à-vis the bottom side of the wear pads and are essentially flush with the bottom side of the wear pad.

It is provided that the reinforcing element is flattened, at least in the area of the holes, preferably parallel to the tread. Flattening is of advantage in particular when blind rivet nuts are used as fastening devices.

The reinforcing element and/or the wear pad may show an anti-twist protection for the fastening device. The holes of the reinforcing element may, for instance, show a cross-sectional shape that is adapted to the cross-sectional shape of the fastening device.

It is preferably provided that the holes of the reinforcing element and/or the recesses of the wear pad show a cross-sectional contour that is adapted to the outside contour of the fastening devices. This may, for instance, be a hexagonal contour.

The recesses of the wear pad preferably show a cavity that extends beyond the length of the fastening devices to be inserted. The said cavity serves the purpose of accommodating the free end of a retaining screw that interacts with the fastening device of the wear pad.

A bearing collar of the fastening device of the wear pad rests, on the one hand, against that side of the reinforcing element that faces the base plate and, on the other hand, on the base plate. It is thus ensured that there is no wear pad material between the fastening device and the base plate.

The bearing collar may terminate essentially flush with the bottom side of the wear pad on that side of the wear pad that faces the base plate.

The reinforcing elements run transversely to the moving direction of the wear pad in operation. At the same time, the reinforcing elements extend in longitudinal direction of the wear pad.

The reinforcing elements are made of a high-strength material, and preferably of metal.

The wear pad may show projections on the bottom side that run transversely to the moving direction, the said projections engaging with mutually adapted channels of the base plate.

At the same time, the reinforcing elements are preferably integrated into these projections.

The projections may show in their longitudinal direction at least two recesses extending into the wear pads, the said recesses forming a space for fastening devices of the base plate in mounted condition of the wear pad. Screw heads of screwing devices for fastening the base plate to the crawler track may, for instance, extend into these recesses.

Arranging the fastening devices for the base plate in recesses provided on the bottom side of the wear pads offers the advantage that the tread does not show any through-holes for the fastening devices of the base plates and can therefore offer increased resistance to wear and tear, with the additional advantage resulting that there are no fastening devices present that are accessible from the tread and can be soiled during operation so that their accessibility is impaired.

The recesses for the fastening devices of the base plate may adjoin the reinforcing elements.

The recesses for the fastening devices of the base plate may additionally extend across the entire width of the projections.

Each of the reinforcing elements integrated into the wear pads may comprise one piece and run in at least two planes, namely in a plane close to the bottom side of the wear pads in the area of the recesses for the fastening devices, and in a plane removed into the interior of the wear pad in the area of the recesses of the projections. Both planes preferably run parallel to the tread.

The space between the projections in longitudinal direction of the wear pad accommodates, with narrow fit, a central stud of the base plate for the purpose of centering the wear pad on the base plate. This means that the space, in connection with the central stud, specifies a clearly defined seat of the wear pad. It goes without saying that the base plate may show several studs, even though a narrow fit exists between the central stud and the space between the projections only.

The wear pad may project vis-à-vis the base plate at least towards the outer side of the crawler track. In this way, the base plate is protected against damage on the one hand, and on the other hand damage caused by the base plates to, for instance, curbs is also prevented.

The material of the wear pad consists of an elastomer, and preferably of a polyurethane.

The material of the wear pad is through-colored with a light luminescent color, preferably Signal Yellow, in accordance with one particularly preferred embodiment.

The fastening devices in the recesses of the wear pad preferably comprise blind rivet nuts. After the rivetting operation, the blind rivet nuts form a deformed annular bead which rests immediately on that side of the reinforcing element that faces the tread. In conjunction with the bearing collar, a firm connection is thus created between the blind rivet nut and the reinforcing element, with no wear pad material weakening the stability of the connection.

Alternatively, the fastening device in the recesses of the wear pad may comprise insert nuts, in which case the holes of the reinforcing element comprise threaded holes, and the insert nuts are suitable for screwing into the threaded holes of the reinforcing elements. The insert nuts may, in case of holes, also show a self-cutting or self-tapping external thread.

The invention further relates to a crawler track for tracked vehicles, in particular for construction machinery, with several base plates and with replaceable wear pads that are suitable for bolting onto the base plates and show the aforementioned features.

The method for manufacturing the wear pads is characterized by the following steps:
- at least one reinforcing element, which preferably extends in longitudinal direction of the wear pad, is initially moulded-in in a mould tool,
- while the reinforcing elements are moulded-in, the at least one reinforcing element is held by projecting mandrels of the mould tool, with the mandrels passing at least partially through holes provided in the reinforcing elements,
- recesses are created with the aid of the projecting mandrels, the said recesses being coaxial to the holes of the reinforcing element and serving as spacers for fastening devices to be mounted at a later stage, and
- after moulding-in of the reinforcing elements, fastening devices are fastened in the holes of the reinforcing elements for completion of the wear pad.

Prior to moulding-in of the reinforcing elements held by the mandrels, a sleeve comprising elastic material may be fitted in position on the mandrels, the said sleeve resting against the mandrel on the one hand and against the front end of the reinforcing element on the other hand. This sleeve is also moulded-in by the wear pad material, thus creating an elastic ring on that side of the reinforcing element that faces the tread, where the said ring facilitates shaping of the annular bead that engages behind the reinforcing element when fastening a blind rivet nut.

In the following, embodiments of the invention are explained in more detail with reference to the drawings.

DESCRIPTION OF THE PREFERRED EMBODIMENTS

Figure 1:
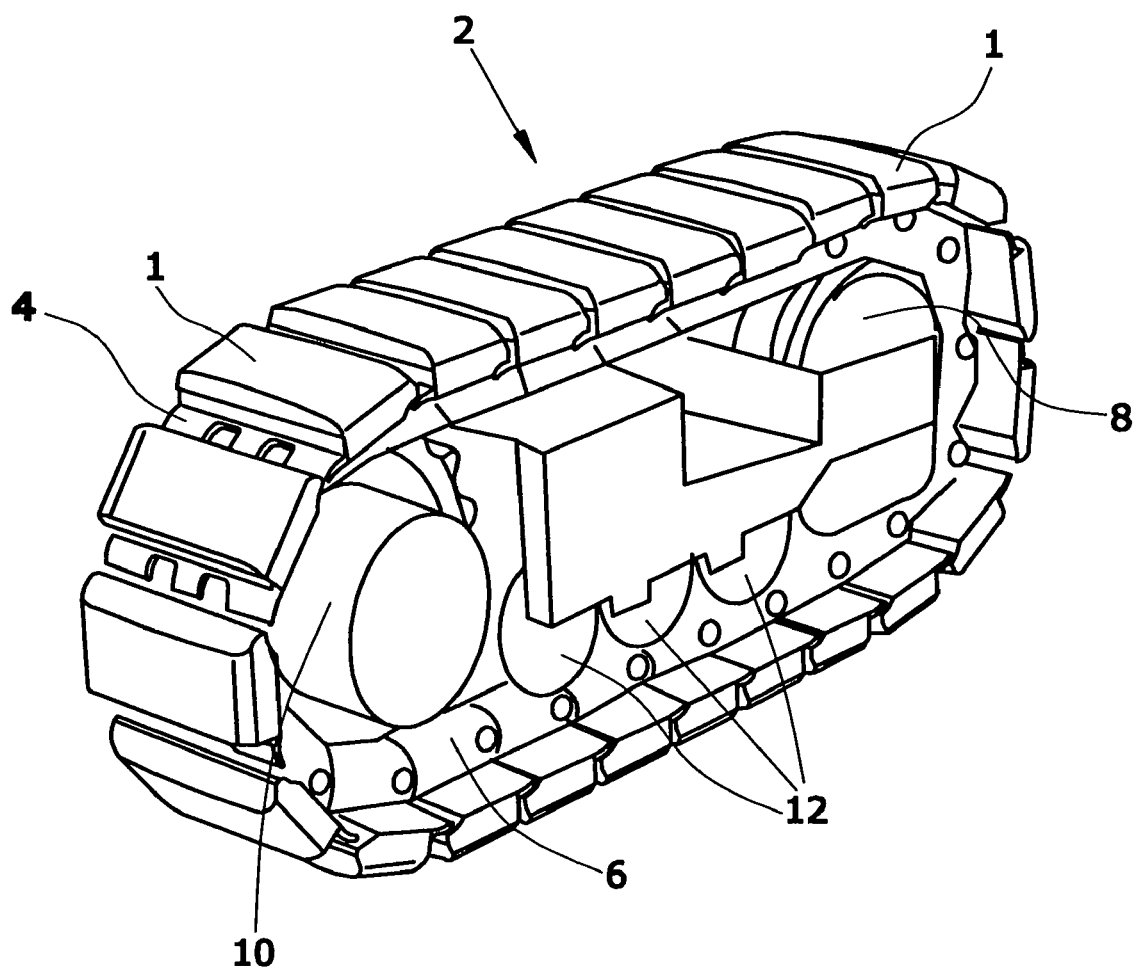
FIG. 1 is a crawler track with wear pads in perspective view.

FIG. 1 shows an embodiment of a crawler track 2 that runs on replaceable wear pads 1. Such crawler tracks are required in the travel drive units of a tracked vehicle, for instance, a road construction machine. The wear pads 1 are fastened to base plates 4 in a detachable manner, with the base plates themselves being fastened to chain links 6 of the infinitely rotating crawler track 2. The crawler track 2 with its chain links 6 rotates around two deflection rollers 8 and 10, one of which is driven. Several support rollers 12 are arranged in the lower return side of the crawler track 2, which support the machine weight and run on the chain links.

Figure 2:
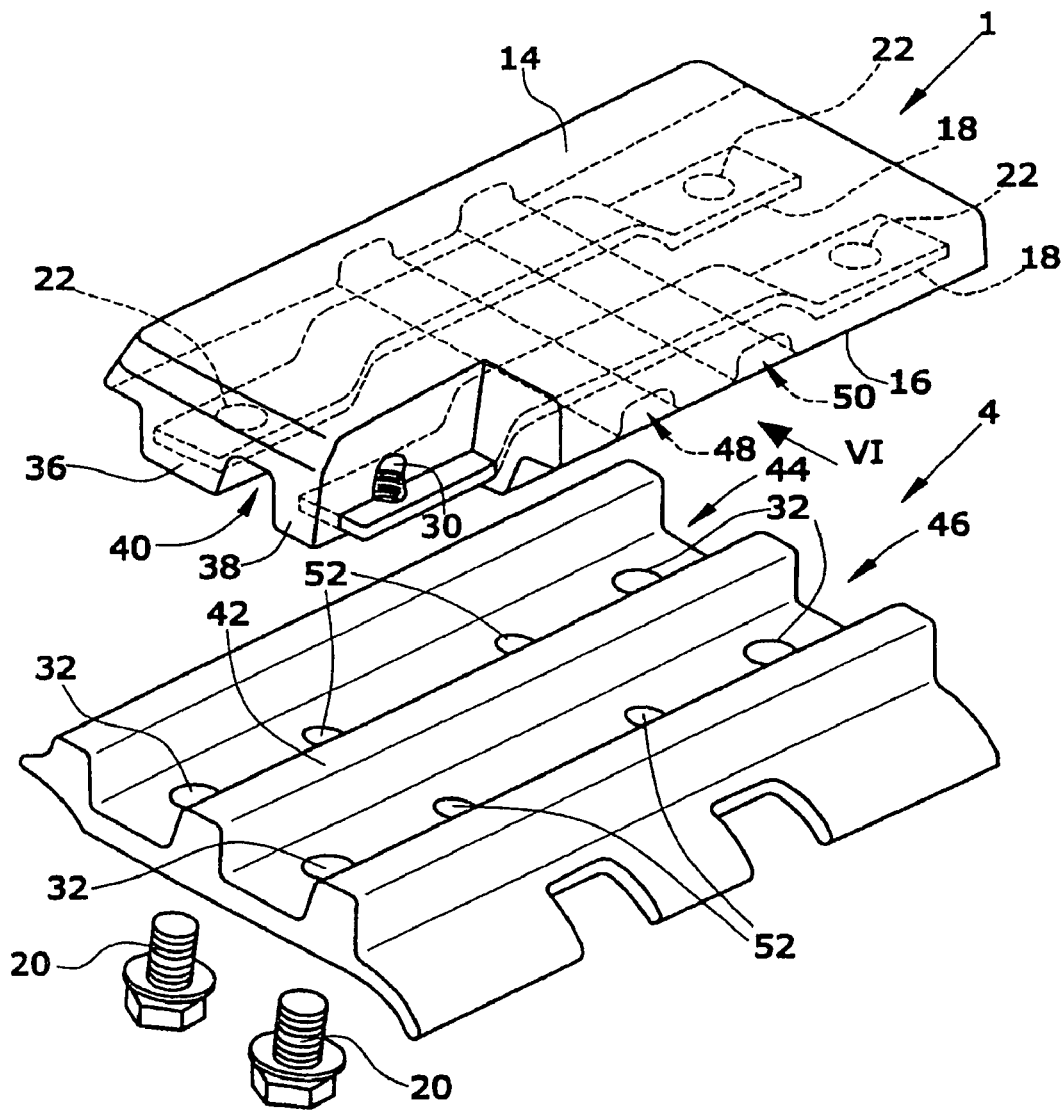
FIG. 2 is a perspective illustration of a wear pad with a base plate of the crawler track.

FIG. 2 shows a perspective view of the wear pad 1 with the subjacent base plate 4 and two of the total number of four retaining screws 20 for fastening the replaceable wear pad 1 on the base plate 4.

The wear pad 1 preferably comprises an elastomeric material like, for instance, polyurethane, which is through-coloured with a light luminescent colour, preferably Signal Yellow, in accordance with one particularly preferred embodiment.

The wear pad 1 shows completely moulded-in reinforcing elements 18 that preferably run in longitudinal direction of the wear pad 1. In the embodiment, two such reinforcing elements 18 are arranged at a lateral distance to one another in the wear pad 1. The reinforcing elements 18 are provided with holes 22 close to their free ends, having a distance in longitudinal direction of the wear pads, by means of which fastening devices 26,28 of the wear pad can be fixed in the holes after manufacture of the wear pads 1.

The wear pads 1 have a tread 14 on their outer side, as well as a bottom side 16 facing the base plate 4.

Above the holes 22, cavities or recesses 30 extend in the direction of the tread 14 that serve the purpose of accommodating fastening devices 26,28. The recesses 30 run coaxially to the holes 22 of the reinforcing element 18. These recesses 30 are adapted to the fastening devices to be inserted. The fastening devices may comprise blind rivet nuts 26 or insert nuts 28, with the insert nuts 28 showing both an internal thread as well as an external thread. The fastening devices 26, 28 are suitable for accommodating retaining screws 20 that are suitable for screwing in from the bottom side 16 of the wear pad, as indicated in FIG. 2. For this purpose, the base plates 4 show suitable through-holes 32 which run coaxially to the fastening devices 28, 28 and the holes 22 of the wear pad 1. It is essential that the fastening devices 26, 28 rest immediately on the base plate 4 in the mounted condition of the wear pad 1.

In the embodiment, the two reinforcing elements 18 in the wear pad 1 run in projections 36, 38 that are parallel to one another and project from the bottom side 16 of the wear pad 1, leaving a space 40 between them. The space 40 between the projections 36, 38 co-operates with a central stud 42 of the base plate 4 in such a manner that the central stud 42 forms a seat for the space 40 between the projections 36, 38, and that the central stud 42 of the base plate 4 is capable of centering the wear pad 1 essentially without play on the crawler track 2. A narrow fit may be chosen between the central stud 42 and the space 40 so as to ensure that the wear pad 1 sits on the base plate 4 essentially without play.

Figure 6:
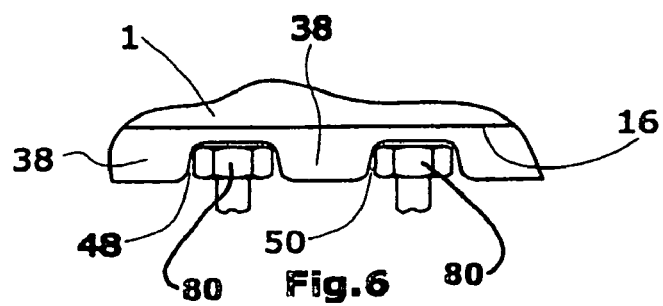
FIG. 6 is a partial view of the recesses in the projections of the wear pad.

The projections 36, 38 lie in channels 44, 46 on the base plate 4 and can rest in the said channels. The outer faces of the projections 36, 38 do, however, have sufficient play with the outer lateral faces of the channels 44, 46 so that the wear pad 1 is centred by the central stud 42 of the base plate 4 only. The projections 36, 38 extending in longitudinal direction of the wear pad 1 are interrupted by two recesses 48, 50 running in transverse direction that create a free space for screw heads of base plate fastening devices 80 which connect the base plate 4 with the chain links 6 through the through-holes 52. As can best be seen from FIG. 6, these fastening devices 80 are therefore covered by the wear pad 1 in mounted condition and will not become clogged or damaged by road material.

As can be seen in FIG. 2, the strip-shaped reinforcing elements 18 run in a plane that is offset in a parallel manner in relation to the tread 14 in the area of the recesses 48, 50.

In longitudinal direction of the wear pad 1, the same projects vis-à-vis the base plate 4 on the outer side of the crawler track 2. Curbs, for instance, are protected in this way against the metallic base plates 4, and on the other hand the base plates 4 are also protected against damage.

Figure 3:
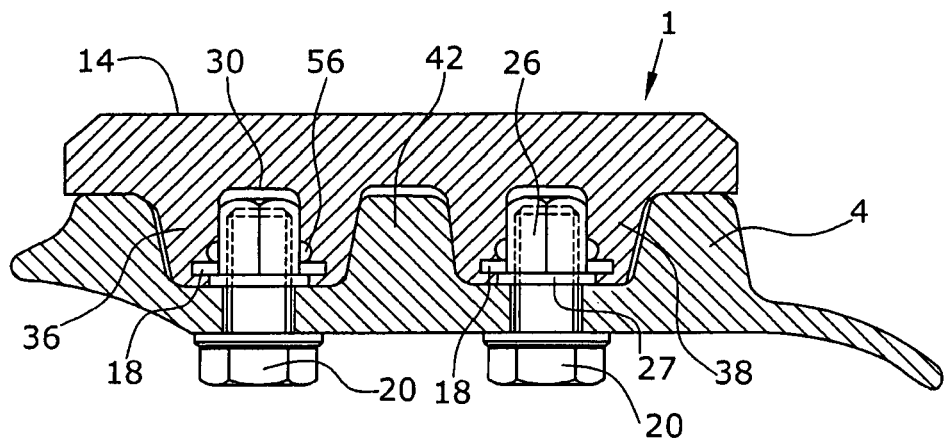
FIG. 3 is a cross-section of an assembly of the wear pad with the base plate.

FIG. 3 shows the wear pad 1 mounted on the base plate 4 in a plane that passes through the axes of the holes 22. The recesses 30 of the wear pad 1 accommodate blind rivet nuts 26 which are firmly fastened to the reinforcing elements 18 in the holes 22 of the reinforcing elements 18 by shaping of an annular bead 56 that forms on account of the riveting operation. The blind rivet nuts 26 preferably rest on the base plate 4 with a bearing collar 27.

Figure 4A:
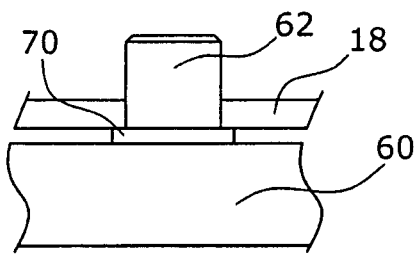
FIG. 4a is the mandrel of a mould tool with reinforcing element fitted in position.

FIGS. 4a to 4d show different possibilities of designing the recesses 30 for the purpose of accommodating fastening devices 26, 28. A part of the mould tool 60 can initially be seen in FIGS. 4a to 4d, with a mandrel 62, 64 or 66 respectively projecting from the said mould tool. With a wear pad 1 in accordance with FIG. 2, the mould tool 60 shows four such mandrels 62, 64, 66. The reinforcing elements 18 are fitted in position on the mandrels 62, 64, 66 with their holes 22, with the reinforcing elements 18 resting on an annular collar 70, the shape of which is adapted to the bearing collar 27 of the blind rivet nut 26 or the insert nut 28. In the embodiment of FIG. 4a, the mandrel 62 is of circular cylindrical shape.

Figure 4B:
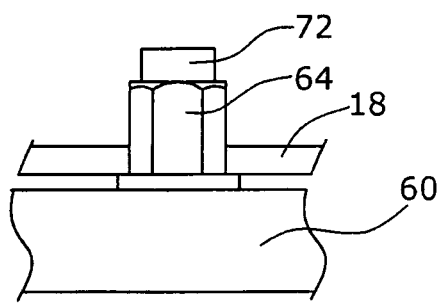
FIG. 4b is a further embodiment of a mandrel of the mould tool.
Figure 7:
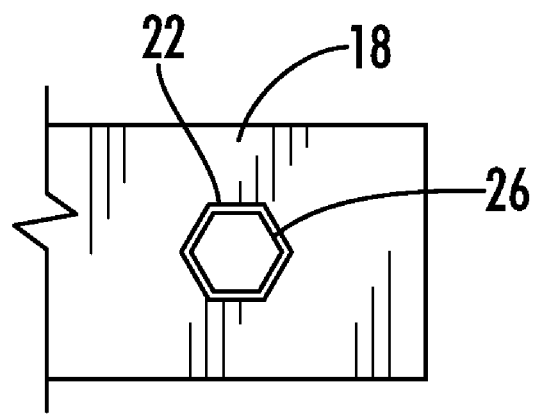
FIG. 7 is a plan view of an end portion of a reinforcing element showing a hexagonal shape hole therethrough with a hexagonal nut received in the hole.

In the embodiment of FIG. 4b, the mandrel 64 has a hexagonal cross-section and can be inserted in a hexagonally shaped hole 22 of the reinforcing element 18. Such a hexagonal shaped hole 22 is shown in plan view in FIG. 7 with the nut 26 in place therein. The mandrel 64 is lengthened by, for instance, a cylindrical appendage 72 which extends beyond the length of a blind rivet nut 26 or an insert nut 28. This creates additional free space for the free end of a retaining screw 20. The appendage 72 may alternatively also show a different cross-sectional shape.

Figure 4C:
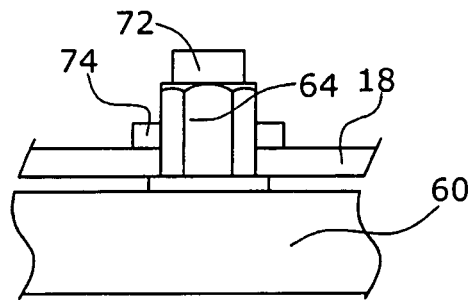
FIG. 4c is the mandrel in accordance with FIG. 4b, with elastic annular sleeve fitted in position.
Figure 4D:
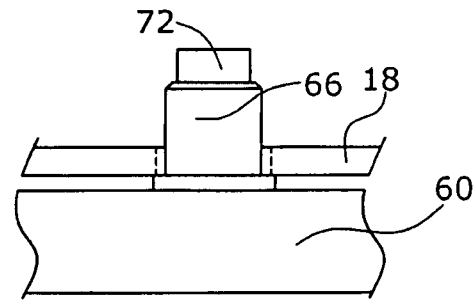
FIG. 4d is a further embodiment of a mandrel for an insert nut.

An annular sleeve 74 comprising of an elastic material like, for instance, foam rubber is additionally fitted in position in the embodiment shown in FIG. 4c, as compared to the embodiment shown in FIG. 4b. This elastic sleeve 74, which sits directly on the reinforcing element 18, forms a soft annular zone after completion of the wear pad 1, on that side of the reinforcing elements 18 that face the tread 14, in such a manner that the annular bead 56 of the blind rivet nut 26 that forms because of the blind rivetting operation is not hindered in its deforming process.

Alternatively, it is also possible to rework the wear pad 1 and to undercut an annular groove for the annular bead 56 of a blind rivet nut 26 in the area behind the hole 22 when using, for instance, a cylindrical mandrel in accordance with FIG. 4a.

Figure 5:
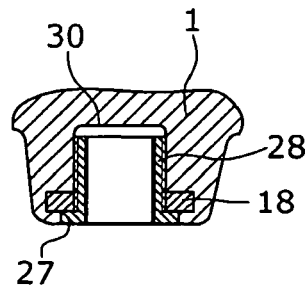
FIG. 5 an insert nut.

FIG. 5 shows the use of an insert nut 28 as fastening device. The insert nut 28 is provided with an external and an internal thread so that the insert nut 28 is suitable for screwing into the holes 22 of a reinforcing element 18 if the holes 22 are designed as threaded holes. Alternatively, the insert nut may show a self-cutting or self-tapping external thread that produces a thread in the holes 22 by itself when being screwed into the holes 22.

Although a preferred embodiment of the invention has been specifically illustrated and described herein, it is to be understood that minor variations may be made in the apparatus without departing from the spirit and scope of the invention, as defined by the appended claims.

What is claimed is:

1. A wear pad apparatus for a crawler track of a construction machine, the apparatus comprising:
    an elongated reinforcing element including upper and lower sides, the reinforcing element having first and second hexagonal recesses defined therein;
    first and second hexagonal nuts received in the first and second hexagonal recesses, respectively, each hexagonal nut engaging the upper side of the reinforcing element, each of the hexagonal nuts having a threaded bore; and
    a wear pad molded from a wear pad material, the reinforcing element and the nuts being embedded in the wear pad material.

2. The apparatus of claim 1, further comprising:
    first and second bearing collars, each one of the bearing collars extending downward from the reinforcing element below one of the holes and terminating essentially flush with a bottom side of the wear pad, a lower end of each bearing collar being free of any wear pad material.

3. The apparatus of claim 1, wherein each of the hexagonal nuts comprises a blind rivet nut, each blind rivet nut including an annular bead engaging the upper side of the reinforcing element.

4. The apparatus of claim 1, wherein:
the reinforcing element comprises a peripheral edge, and the peripheral edge is completely embedded in the wear pad material.

5. The apparatus of claim 1, wherein:
the wear pad includes first and second blind cavities defined therein co-axial with and above the threaded bores of the first and second hexagonal nuts, respectively.

6. The apparatus of claim 1, wherein:
the wear pad is an elongated wear pad having a width and a length longer than the width; and
the apparatus further comprises a second elongated reinforcing element, the reinforcing elements being parallel to each other and to the length of the wear pad.

7. The apparatus of claim 6, wherein:
the wear pad includes first and second extensions extending downwardly and lengthwise; and
one of the reinforcing elements is embedded in each of the extensions.

8. The apparatus of claim 7, wherein:
each of the extensions includes at least one widthwise recess; and
each of the elongated reinforcing elements includes an intermediate raised portion located above the widthwise recess of its associated wear pad extension.

9. A replaceable wear pad apparatus for a crawler track of a construction machine, the crawler track including a plurality of base plates, the apparatus comprising:
(a) a wear pad molded from a wear pad material, the wear pad including:
  (1) an upper tread surface;
  (2) a bottom surface;
  (3) a length;
  (4) a width; and
  (5) first and second downward projections extending parallel to the length of the wear pad, each of the downward projections including an intermediate recess interrupting the projections;
(b) first and second reinforcing elements fixedly embedded in the first and second projections, respectively, each reinforcing element including:
  (1) upper and lower sides;
  (2) an intermediate portion lying in an upper plane located above the intermediate recess of the respective downward projection of the wear pad;
  (3) first and second outer portions each lying in a lower plane lower than the upper plane, the outer portions being on opposite sides of the intermediate portion;
  (4) at least one hexagonal recess defined in each of the outer portions; and
  (5) a peripheral edge completely embedded in the wear pad material;
(c) a plurality of nuts, each of the nuts including:
  (1) a hexagonal outside contour received in one of the hexagonal recesses;
  (2) a nut surface engaging the upper surface of its associated reinforcing element; and
  (3) a threaded bore extending upward above the reinforcing element; and
(d) a plurality of bearing collars, each one of the bearing collars extending downward from one of the reinforcing elements below one of the holes and terminating essentially flush with the bottom side of the wear pad, a lower end of each bearing collar being free of any wear pad material; and
(e) wherein the wear pad includes a plurality of blind cavities defined therein, each of the cavities being co-axial with and above one of the threaded bores of one of the hexagonal nuts.

10. The apparatus of claim 9, wherein each of the nuts comprises a blind rivet nut.

11. A replaceable wear pad apparatus for a crawler track of a construction machine, the apparatus comprising:
a wear pad molded from a wear pad material, the wear pad including an upper tread surface and a bottom surface, the wear pad having a length and a width, the wear pad including first and second downward projections extending parallel to the length of the wear pad, each of the downward projections including at least one intermediate recess interrupting the projections;
first and second reinforcing elements fixedly embedded in the first and second projections, respectively, each reinforcing element including upper and lower sides;
wherein each of the reinforcing elements includes an intermediate portion lying in an upper plane located above the intermediate recess of the respective downward projection of the wear pad, and first and second outer portions each lying in a lower plane lower than the upper plane, the outer portions being on opposite sides of the intermediate portion;
wherein each of the reinforcing elements includes at least one vertical hole extending through each of its outer portions; and
further comprising a plurality of fastening devices, each of the fastening devices being located co-axial with one of the holes and engaging the upper surface of its associated reinforcing element, the fastening device including a threaded bore extending upward above the reinforcing element.

12. The apparatus of claim 11, further comprising:
a plurality of bearing collars, each one of the bearing collars extending downward from one of the reinforcing elements below one of the holes and terminating essentially flush with the bottom side of the wear pad, a lower end of each bearing collar being free of any wear pad material.

13. The apparatus of claim 11, wherein the fastening devices comprise blind rivet nuts, each nut including an annular bead engaging the upper side of its associated reinforcing element.

14. The apparatus of claim 11, wherein the bearing collars comprise integral parts of the fastening devices.

15. The apparatus of claim 11, wherein:
each of the holes comprises a hexagonal contour; and
each of the fastening devices comprises a hexagonal nut received in one of the hexagonal contours.

16. The apparatus of claim 11, wherein:
each of the reinforcing elements comprises a peripheral edge, and the peripheral edge is completely embedded in the wear pad material.

17. The apparatus of claim 11, wherein:
the wear pad includes a plurality of blind cavities defined therein, each of the cavities being co-axial with and above one of the threaded bores of one of the fastening devices.

18. A replaceable wear pad apparatus for a crawler track of a construction machine, the crawler track including a plurality of base plates, the apparatus comprising:

at least one reinforcing element having upper and lower sides, and having a peripheral outer edge, the reinforcing element including at least two spaced holes defined therethrough from the lower side to the upper side;

a wear pad molded from a wear pad material so that the wear pad material is fixedly bonded to the reinforcing element and there can be no relative movement between the wear pad and the reinforcing element, the complete peripheral outer edge of the reinforcing element being embedded in the molded wear pad material, the wear pad including an upper tread surface and a bottom surface, the wear pad including at least two blind cavities defined therein co-axial with and above the holes of the reinforcing element, the blind cavities being closed so that they do not extend to the upper tread surface; and at least two fastening devices one of which is received in each of the cavities; and at least two bearing collars extending downward from the reinforcing element and terminating essentially flush with the bottom side of the wear pad for engaging one of the base plates of the crawler track, the lower end of each bearing collar being free of any wear pad material.

19. The apparatus of claim 18, wherein the fastening devices comprise blind rivet nuts, each nut including an annular bead engaging the upper side of the reinforcing element.

20. The apparatus of claim 18, wherein the fastening devices comprise insert nuts threadedly engaged with the holes of the reinforcing element.

21. The apparatus of claim 18, wherein the at least two bearing collars comprise integral parts of the at least two fastening devices, respectively.

* * * * *